US012110041B2

(12) United States Patent
Choi et al.

(10) Patent No.: US 12,110,041 B2
(45) Date of Patent: Oct. 8, 2024

(54) SYSTEM AND METHOD FOR COMPLETING TRAJECTORY PREDICTION FROM AGENT-AUGMENTED ENVIRONMENTS

(71) Applicant: Honda Motor Co., Ltd., Tokyo (JP)

(72) Inventors: Chiho Choi, San Jose, CA (US); Srikanth Malla, Sunnyvale, CA (US); Sangjae Bae, Berkley, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 739 days.

(21) Appl. No.: 17/161,136

(22) Filed: Jan. 28, 2021

(65) Prior Publication Data

US 2022/0153307 A1    May 19, 2022

Related U.S. Application Data

(60) Provisional application No. 63/113,710, filed on Nov. 13, 2020.

(51) Int. Cl.
*B60W 60/00* (2020.01)
*G06V 20/56* (2022.01)

(52) U.S. Cl.
CPC ......... *B60W 60/0027* (2020.02); *G06V 20/56* (2022.01); *B60W 2420/403* (2013.01); *B60W 2554/20* (2020.02); *B60W 2554/404* (2020.02)

(58) Field of Classification Search
CPC ....... B60W 60/0027; B60W 2420/403; B60W 2554/20; B60W 2554/404; B60W 2554/4049; B60W 60/00272; B60W 60/00274; B60W 2554/4029; B60W 2554/4045; G06V 20/56; G06V 10/82; G06F 16/9537; G06F 16/587
See application file for complete search history.

(56) References Cited

U.S. PATENT DOCUMENTS

| | | | | |
|---|---|---|---|---|
| 10,839,530 | B1* | 11/2020 | Berger | G06N 20/00 |
| 2018/0332256 | A1* | 11/2018 | Ni | G06F 18/2323 |
| 2019/0141310 | A1* | 5/2019 | Pohl | H04N 13/122 |
| 2019/0311546 | A1* | 10/2019 | Tay | G05D 1/0088 |

(Continued)

OTHER PUBLICATIONS

Alexandre Alahi, Kratarth Goel, Vignesh Ramanathan, Alexandre Robicquet, Li Fei-Fei, and Silvio Savarese. "Social lstm: Human trajectory prediction in crowded spaces." In CVPR, 2016.

(Continued)

*Primary Examiner* — James J Lee
*Assistant Examiner* — Wenyuan Yang
(74) *Attorney, Agent, or Firm* — RANKIN, HILL & CLARK LLP

(57) ABSTRACT

A system and method for completing trajectory prediction from agent-augmented environments that include receiving image data associated with surrounding environment of an ego agent and processing an agent-augmented static representation of the surrounding environment of the ego agent based on the image data. The system and method also include processing a set of spatial graphs that correspond to an observation time horizon based on the agent-augmented static representation. The system and method further include predicting future trajectories of agents that are located within the surrounding environment of the ego agent based on the spatial graphs.

17 Claims, 7 Drawing Sheets

(56) References Cited

U.S. PATENT DOCUMENTS

| | | | | |
|---|---|---|---|---|
| 2020/0025931 A1* | 1/2020 | Liang | .................... | G06F 18/251 |
| 2020/0218979 A1* | 7/2020 | Kwon | ................. | G06F 18/2155 |
| 2020/0410751 A1* | 12/2020 | Omari | .................... | G06V 20/58 |
| 2021/0064999 A1* | 3/2021 | Liu | ........................ | G06N 3/084 |

OTHER PUBLICATIONS

Brett W Bader and Tamara G Kolda. "Algorithm 862: Matlab tensor classes for fast algorithm prototyping." ACM Transactions on Mathematical Software (TOMS), 32(4):635-653, 2006.

Huikun Bi, Zhong Fang, Tianlu Mao, Zhaoqi Wang, and Zhigang Deng. "Joint prediction for kinematic trajectories in vehicle-pedestrian-mixed scenes." In CVPR, pp. 10383-10392, 2019.

Huikun Bi, Ruisi Zhang, Tianlu Mao, Zhigang Deng, and Zhaoqi Wang. "How can i see my future? fvtraj: Using first-person view for pedestrian trajectory prediction."

Chiho Choi. "Shared cross-modal trajectory prediction for autonomous driving." arXiv preprint arXiv:2004.00202, 2020.

Chiho Choi and Behzad Dariush. "Looking to relations for future trajectory forecast." In Proceedings of the IEEE International Conference on Computer Vision (ICCV), 2019.

Chiho Choi, Srikanth Malla, Abhishek Patil, and Joon Hee Choi. "Drogon: A trajectory prediction model based on intention-conditioned behavior reasoning." In Conference on Robot Learning, 2020.

Agrim Gupta, Justin Johnson, Li Fei-Fei, Silvio Savarese, and Alexandre Alahi. "Social gan: Socially acceptable trajectories with generative adversarial networks." In CVPR, 2018.

Dirk Helbing and Peter Molnar. "Social force model for pedestrian dynamics." Physical review E, 51(5):4282, 1995.

Joey Hong, Benjamin Sapp, and James Philbin. "Rules of the road: Predicting driving behavior with a convolutional model of semantic interactions." In Proceedings of the IEEE Conference on Computer Vision and Pattern Recognition, pp. 8454-8462, 2019.

Yue Hu, Siheng Chen, Ya Zhang, and Xiao Gu. "Collaborative motion prediction via neural motion message passing." In Proceedings of the IEEE/CVF Conference on Computer Vision and Pattern Recognition, pp. 6319-6328, 2020.

Yingfan Huang, Huikun Bi, Zhaoxin Li, Tianlu Mao, and Zhaoqi Wang. "Stgat: Modeling spatial-temporal interactions for human trajectory prediction." In Proceedings of the IEEE International Conference on Computer Vision, pp. 6272-6281, 2019.

Thomas N. Kipf and Max Welling. "Semi-supervised classification with graph convolutional networks." In 5th International Conference on Learning Representations, ICLR, 2017.

Vineet Kosaraju, Amir Sadeghian, Roberto Martin-Martin, Ian Reid, Hamid Rezatofighi, and Silvio Savarese. "Social-bigat: Multimodal trajectory forecasting using bicycle-gan and graph attention networks." In Advances in Neural Information Processing Systems, pp. 137-146, 2019.

Namhoon Lee, Wongun Choi, Paul Vernaza, Christopher B Choy, Philip HS Torr, and Manmohan Chandraker. "Desire: Distant future prediction in dynamic scenes with interacting agents." In CVPR, pp. 336-345, 2017.

Alon Lerner, Yiorgos Chrysanthou, and Dani Lischinski. "Crowds by example." In Computer graphics forum, vol. 26, pp. 655-664. Wiley Online Library, 2007.

Jiachen Li, Hengbo Ma, and Masayoshi Tomizuka. "Conditional generative neural system for probabilistic trajectory prediction." In 2019 IEEE/RSJ International Conference on Intelligent Robots and Systems (IROS), pp. 6150-6156. IEEE, 2019.

Jiachen Li, Fan Yang, Masayoshi Tomizuka, and Chiho Choi. "Evolvegraph: Multi-agent trajectory prediction with dynamic relational reasoning." Advances in Neural Information Processing Systems (NeurIPS), 2020.

Yuexin Ma, Xinge Zhu, Sibo Zhang, Ruigang Yang, Wenping Wang, and Dinesh Manocha. "Trafficpredict: Trajectory prediction for heterogeneous traffic-agents." 2019.

Karttikeya Mangalam, Harshayu Girase, Shreyas Agarwal, Kuan-Hui Lee, Ehsan Adeli, Jitendra Malik, and Adrien Gaidon. "It is not the journey but the destination: End-point conditioned trajectory prediction." arXiv preprint arXiv:2004.02025, 2020.

Abduallah Mohamed, Kun Qian, Mohamed Elhoseiny, and Christian Claudel. "Social-stgcnn: A social spatio-temporal graph convolutional neural network for human trajectory prediction." In Proceedings of the IEEE/CVF Conference on Computer Vision and Pattern Recognition, pp. 14424-14432, 2020.

Stefano Pellegrini, Andreas Ess, Konrad Schindler, and Luc Van Gool. "You'll never walk alone: Modeling social behavior for multi-target tracking." In ICCV, pp. 261-268. IEEE, 2009.

Amir Sadeghian, Vineet Kosaraju, Ali Sadeghian, Noriaki Hirose, Hamid Rezatofighi, and Silvio Savarese. "Sophie: An attentive gan for predicting paths compliant to social and physical constraints." In Proceedings of the IEEE Conference on Computer Vision and Pattern Recognition, pp. 1349-1358, 2019.

Satoshi Suzuki et al. "Topological structural analysis of digitized binary images by border following." Computer vision, graphics, and image processing, 30(1):32-46, 1985.

Charlie Tang and Russ R Salakhutdinov. "Multiple futures prediction." In Advances in Neural Information Processing Systems, pp. 15424-15434, 2019.

Chaofan Tao, Qinhong Jiang, Lixin Duan, and Ping Luo. "Dynamic and static context-aware lstm for multi-agent motion prediction." arXiv preprint arXiv:2008.00777, 2020.

Anirudh Vemula, Katharina Muelling, and Jean Oh. "Social attention: Modeling attention in human crowds." In 2018 IEEE International Conference on Robotics and Automation (ICRA), 2018.

Kelvin Xu, Jimmy Ba, Ryan Kiros, Kyunghyun Cho, Aaron Courville, Ruslan Salakhudinov, Rich Zemel, and Yoshua Bengio. "Show, attend and tell: Neural image caption generation with visual attention." In International conference on machine learning, pp. 2048-2057, 2015.

Zhitao Ying, Jiaxuan You, Christopher Morris, Xiang Ren, Will Hamilton, and Jure Leskovec. "Hierarchical graph representation learning with differentiable pooling." In Advances in neural information processing systems, pp. 4800-4810, 2018.

* cited by examiner

SYSTEM AND METHOD FOR COMPLETING TRAJECTORY PREDICTION FROM AGENT-AUGMENTED ENVIRONMENTS

CROSS-REFERENCE TO RELATED APPLICATION

This application claims priority to U.S. Provisional Application Ser. No. 63/113,710 filed on Nov. 13, 2020, which is expressly incorporated herein by reference.

BACKGROUND

Trajectory prediction is an essential basis to deploy advanced autonomous navigation for the safe operation of intelligent machines (i.e., robots and vehicles) in interactive environments. Future trajectory prediction is a challenging problem due to high variability in human behavior during interactions with external entities (i.e., other road agents, environments, etc.). Existing methods are likely to overlook the influence of physical constraints in modeling social interactions which often results in generating implausible predictions from an observed environment.

The importance of modeling social aspects of human behaviors has been broadly highlighted and extensively researched in the past. One line of trajectory prediction research has been directed toward the advancement of human-human interactions with no consideration of an environment. However, the interactive environment is not simply an open space. There exist influences due to static structures and obstacles in a scene. Accordingly, current methods are hard to verify the physical functionality on human-space interaction modeling from their weak consideration of the environment.

BRIEF DESCRIPTION

According to one aspect, a computer-implemented method for completing trajectory prediction from agent-augmented environments that includes receiving image data associated with surrounding environment of an ego agent and processing an agent-augmented static representation of the surrounding environment of the ego agent based on the image data. The computer-implemented method also includes processing a set of spatial graphs that correspond to an observation time horizon based on the agent-augmented static representation. Nodes in the spatial graphs are simultaneously clustered considering their spatial and temporal interactions. The computer-implemented method further includes predicting future trajectories of agents that are located within the surrounding environment of the ego agent based on the spatial graphs.

According to another aspect, a system for completing trajectory prediction from agent-augmented environments that includes a memory storing instructions when executed by a processor cause the processor to receive image data associated with surrounding environment of an ego agent and process an agent-augmented static representation of the surrounding environment of the ego agent based on the image data. The instructions also cause the processor to process a set of spatial graphs that correspond to an observation time horizon based on the agent-augmented static representation. Nodes in the spatial graphs are simultaneously clustered considering their spatial and temporal interactions. The system further causes the processor to predict future trajectories of agents that are located within the surrounding environment of the ego agent based on the spatial graphs.

According to yet another aspect, a non-transitory computer readable storage medium storing instructions that when executed by a computer, which includes a processor perform a method that includes receiving image data associated with surrounding environment of an ego agent and processing an agent-augmented static representation of the surrounding environment of the ego agent based on the image data. The method also includes processing a set of spatial graphs that correspond to an observation time horizon based on the agent-augmented static representation. Nodes in the spatial graphs are simultaneously clustered considering their spatial and temporal interactions. The method further includes predicting future trajectories of agents that are located within the surrounding environment of the ego agent based on the spatial graphs.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
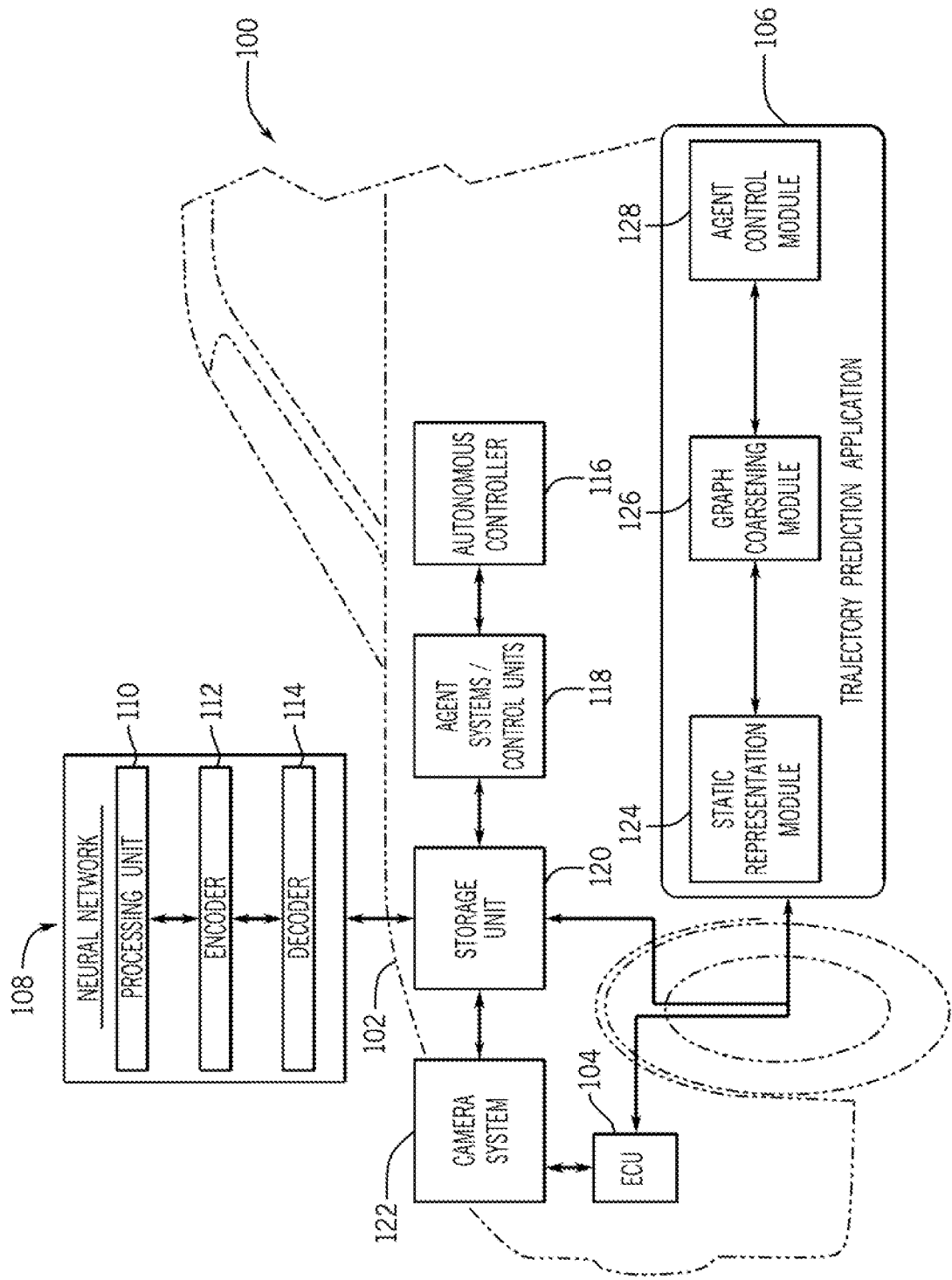
FIG. 1 is a schematic view of an exemplary operating environment for implementing systems and methods for completing trajectory prediction from agent-augmented environments according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for completing trajectory prediction from agent-augmented environments according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes an ego agent 102. The ego agent 102 may include, but may not be limited to a transportation vehicle (e.g., car, truck, bus, airplane, etc.), a robot, a motorized bicycle/scooter, an automated shopping cart, an automated suit case, a motorized wheel chair, and the like. In one embodiment, the ego agent 102 may include components, systems, and sub-systems that maybe operably and electronically controlled by an electronic control unit (ECU) 104. The ECU 104 may be configured to execute one or more applications, operating systems, ego agent system and subsystem user interfaces, among others. The ECU 104 may also execute a trajectory prediction application 106 that may be configured to provide trajectory prediction by encoding multi-scale agent interactions from agent-augmented environments.

As shown in the illustrative example of FIG. 2, the surrounding environment 200 of the ego agent 102 may be captured within a plurality of images. The plurality of images may be captured at a plurality of time steps. The images may capture agents 202, 204 (additional to the ego agent 102) that are located (e.g., traveling) within the surrounding environment of the ego agent 102. The agents 202, 204 may include, but may be limited to additional transportation vehicles, pedestrians, robots, motorized bicycles/scooters, automated shopping carts, automated suit cases, motorized wheel chairs, and the like.

In one embodiment, the trajectory prediction application 106 may be configured to execute image logic to classify the agents 202, 204 based on analysis of the plurality of images of the surrounding environment 200. The agents 202, 204 may be classified as dynamic agents 202 that may be dynamically located at different locations of the surrounding environment 200 based on their movement. As discussed below, the trajectory prediction application 106 may be configured to predict future behavior in the form of respective predicted trajectories (as represented by the dashed arrows) for each of the dynamic agents 202. Additionally, the trajectory prediction application 106 may be configured to execute the image logic to analyze the plurality of images of the surrounding environment of the ego agent 102 and to classify one or more of the agents 202, 204 as static agents 204 that are located within respective locations of the surrounding environment 200.

The trajectory prediction application 106 may also be configured to execute the image logic to analyze image data associated with the plurality of images and identify static structures 206 that may be located within the surrounding environment of the ego agent 102. The static structures 206 may include static obstacles such as buildings, traffic infrastructure (e.g., traffic lights, traffic signage, posts, cones, barrels), guard rails, trees, and the like. With continued reference to FIG. 2A, in some instances, implausible future behaviors may be predicted for one or more of the dynamic agents 202. As shown, an implausible future trajectory 208 may be predicted for a dynamic agent 202 as passing through a static structure 206 that may be configured as a building.

Figure 2A:
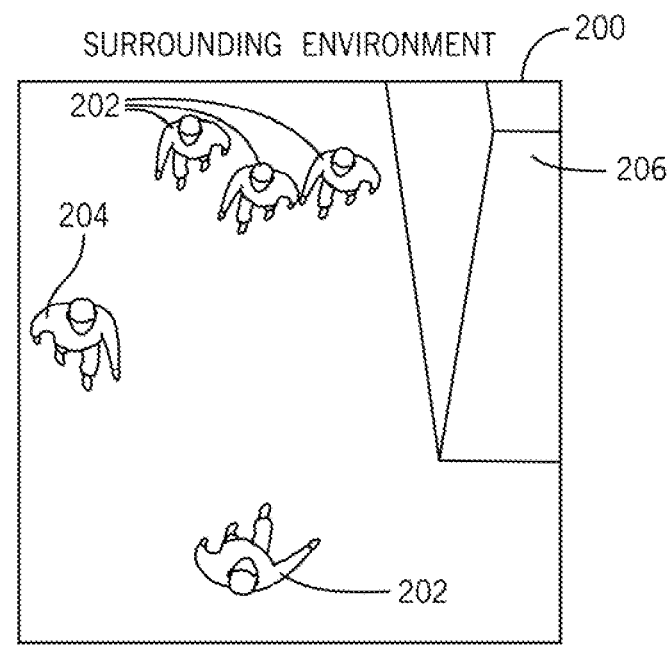
FIG. 2A is an illustrative example of a surrounding environment of an ego agent according to an exemplary embodiment of the present disclosure.

As discussed below, as represented in an illustrative example of FIG. 2B, upon identifying the dynamic agent(s) 202, static agents(s) 204, and the existence of any static structures 206 that may be located within the surrounding environment 200 of the ego agent 102 as captured within plurality of images, the trajectory prediction application 106 may be configured to process an agent-augmented surrounding environment 210. The agent-augmented surrounding environment 210 is an augmented representation of the surrounding environment 200 of the ego agent 102 at a plurality of time steps. In particular, the trajectory prediction application 106 may be configured to graphically augment each of the images of the surrounding environment 200 of the ego agent 102 (as represented in FIG. 2A) with respect to one or more static structures 206 that may occlude one or more perspective paths of respective dynamic agents 202.

Figure 2B:
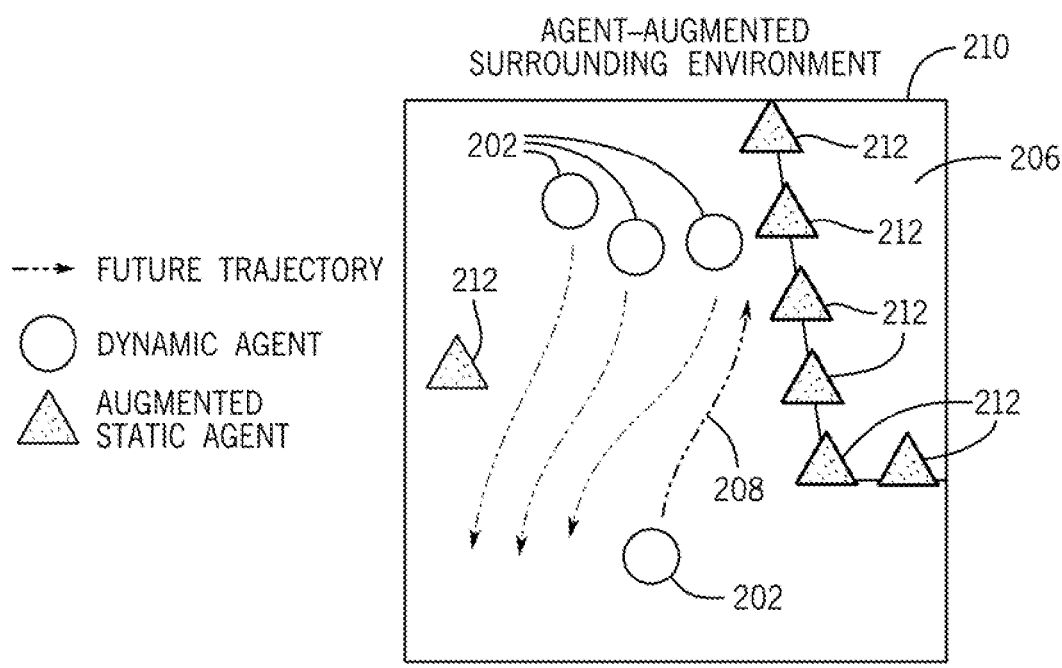
FIG. 2B is an illustrative example of an agent-augmented surrounding environment of the ego agent according to an exemplary embodiment of the present disclosure.

As represented in FIG. 2B, respective boundaries of static structures 206 may be augmented with augmented static agents 212 that may represent the occlusion caused by the existence of the respective static structures 206. Accordingly, the agent-augmented surrounding environment 210 may represent the static structures 206 as multiple augmented static agents 212 that enable the application 106 to learn physical constraints of the surrounding environment 200 of the ego agent 102. Additionally, the application 106 may be configured to augment static agents 204 as previously identified as being located within the surrounding environment 200 into augmented static agents 212 since they may also occlude the respective perspective paths of one or more dynamic agents 202. Accordingly, the trajectory prediction application 106 may be configured to leverage a similarity between static agents 204 and static structures 206 to represent environmental structures as multiple augmented static agents 212.

As discussed in more detail below, upon outputting the agent-augmented surrounding environment 210 as a static representation of the surrounding environment 200, the trajectory prediction application 106 may be configured to input the static representation to a neural network 108. In one configuration, the trajectory prediction application 106 may utilize the neural network 108 to construct a set of spatial graphs that pertain to the static representation of the surrounding environment 200 of the ego agent 102. In one configuration, the number of spatial graphs may be based on an observation time horizon (e.g., number of time steps) of the surrounding environment 200 of the ego agent 102.

In an exemplary embodiment, the neural network 108 may utilize an encoder 112 of the neural network 108 to simultaneously cluster the nodes of the spatial graphs. As discussed below, simultaneous clustering may be based on spatial and temporal interactions of the dynamic agents 202 and the augmented static agents 212. The encoder 112 may be configured to generate coarsened graphs using a graph coarsening process that is discussed below. Accordingly, the encoder 112 of the neural network 108 encodes behavioral representations in various scales which may thereby enable the neural network 108 to learn fundamental entities of agent interactions.

In one or more embodiments, a decoder 114 of the neural network 108 may be configured to decode a coarsened spatial temporal graph that has been clustered to capture both spatial locality and temporal dependency of the agents 202, 204 within the surrounding environment 200 of the ego agent 102. As discussed in more detail below, the decoder 114 may be configured to generate future trajectories of the dynamic agents 202 using the previously encoded interaction features. In particular, the neural network 108 may predict respective trajectories of each of the dynamic agents 202 that are located within the surrounding environment of the ego agent 102 at one or more future time steps (t+1, t+2, t+n). The neural network 108 may thereby communicate respective data to the trajectory prediction application 106.

In one embodiment, upon receiving the prediction of the respective trajectories of each of the dynamic agents 202 at one or more future time steps, the trajectory prediction application 106 may be configured to output instructions to communicate autonomous control parameters to an autonomous controller 116 of the ego agent 102 to autonomously control the ego agent 102 to avoid overlap with the respective predicted trajectories that are respectively associated with each of the dynamic agents 202.

In an additional embodiment, the trajectory prediction application 106 may be configured to output instructions to agent systems/control units 118. The agent systems/control units 118 may include driver assistance systems that may provide audio and/or visual alerts to an operator (not shown) (e.g., driver, remote operator) of the ego agent 102 in one or more circumstances. The trajectory prediction application 106 may be configured to output instructions to the agent systems/control units 118 to provide one or more alerts to the operator of the ego agent 102 to avoid overlap with the respective predicted trajectories of the dynamic agents 202 that are located within the surrounding environment of the ego agent 102.

With continued reference to FIG. 1, in addition to the ECU 104, the autonomous controller 116 and the agent systems/control units 118, the ego agent 102 may also include a storage unit 120 and a camera system 122. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego agent 102.

The ECU 104 may also include a communication device (not shown) for sending data internally within (e.g., between one or more components) the ego agent 102 and communicating with externally hosted computing systems (e.g., external to the ego agent 102). Generally, the ECU 104 may communicate with the storage unit 120 to execute the one or more applications, operating systems, ego agent system and subsystem user interfaces, and the like that are stored within the storage unit 120. In one embodiment, the ECU 104 may communicate with the autonomous controller 116 to execute autonomous driving commands to operate the ego agent 102 to be fully autonomously driven or semi-autonomously driven in a particular manner. As discussed, the autonomous driving commands may be based on commands that may be communicated by the trajectory prediction application 106.

In one or more embodiments, the autonomous controller 116 may autonomously control the operation of the ego agent 102 by providing one or more commands to one or more of the agent systems/control units 118 to provide full autonomous or semi-autonomous control of the ego agent 102. Such autonomous control of the ego agent 102 may be provided by sending one or more commands to control one or more of the agent systems/control units 118 to operate (e.g., drive) the ego agent 102 during one or more circumstances (e.g., when providing driver assist controls) and/or to fully control operation of the ego agent 102 during an entire trip of the ego agent 102. The one or more commands may be provided to one or more agent systems/control units 118 that include, but are not limited to an engine control unit, a braking control unit, a transmission control unit, a steering control unit, driver assistance systems, and the like to control the ego agent 102 to be autonomously driven and/or provide audio and/or visual alerts to an operator of the ego agent 102 in one or more circumstances.

In one or more embodiments, the storage unit 120 of the ego agent 102 may be configured to store one or more executable files associated with one or more operating systems, applications, associated operating system data, application data, ego agent system and subsystem user interface data, and the like that are executed by the ECU 104. The storage unit 120 may also be configured to store computer implemented logic, such as image logic that may be utilized by the trajectory prediction application 106 to analyze image data provided by the camera system 122. In one or more embodiments, the storage unit 120 may be accessed by the trajectory prediction application 106 to store data associated with future trajectories predicted by the neural network 108 for each of the dynamic agents 202 to be further utilized to provide one or more commands to the autonomous controller 116 and/or the agent systems/control units 118.

With continued reference to FIG. 1, the camera system 122 may include one or more of the cameras (not shown) that may be positioned in one or more directions and at one or more areas to capture the plurality of images of the surrounding environment 200 of the ego agent 102 (e.g., images of the roadway on which the ego agent 102 is traveling). The one or more cameras of the camera system 122 may be disposed at external front portions of the ego agent 102, including, but not limited to different portions of the ego agent dashboard, ego agent bumper, ego agent front lighting units, ego agent fenders, and the windshield, robotic portions. In one embodiment, the one or more cameras may be configured as RGB cameras that may capture RGB bands that are configured to capture rich information about object appearance, as well as relationships and interactions between the ego agent 102, dynamic agents 202, static agents 204, and static structures 206 located within the surrounding environment 200 of the ego agent 102.

In alternate embodiments, the one or more cameras may be configured as stereoscopic cameras that are configured to capture environmental information in the form three-dimensional images. In one or more configurations, the one or more cameras may be configured to capture a plurality of first person viewpoint RGB images/videos of the surrounding environment 200 of the ego agent 102. The camera system 122 may be configured to convert the plurality of RGB images/videos (e.g., sequences of images) into image data that is communicated to the trajectory prediction application 106 to be further analyzed.

In an exemplary embodiment, the neural network 108 may be configured as a plurality of graph neural networks (GNNs) that may be configured to execute machine learning/deep learning processes to model pair-wise interactions between the ego agent 102, the dynamic agents 202 located within the surrounding environment 200, and the static structures 206 that may be located within the surrounding environment of the ego agent 102. The neural network 108 may be executed by a processing unit 110. The processing unit 110 may be configured to provide processing capabilities to be configured to utilize machine learning/deep learning to provide artificial intelligence capabilities that may be executed to analyze inputted data and to output data to the trajectory prediction application 106.

In one embodiment, the neural network 108 may be configured to utilize the encoder 112 to code the pair-wise interactions to be shared in fine-scale spatial graphs. As discussed below, the encoder 112 may be configured to dynamically map each of the individual nodes of the spatial graphs to a set of clusters. As a result, each cluster may correspond to a node in a new coarsened graph. Accordingly, while generating the coarsened graph, the neural network 108 may intuitively learn a clustering strategy that operates among the nodes in a spatial and temporal dimension of graphs. As such, the encoder 112 encodes behavioral representations in a coarser level as a notion of both spatial locality and temporal dependency. The neural network 108 may utilize the decoder 114 to generate future trajectories respectively associated with each of the dynamic agents 202 using previously encoded interaction features. Accordingly, the neural network 108 may output future predicted trajectories respectively associated with each of the dynamic agents 202 at one or more future time steps to the trajectory prediction application 106. The trajectory prediction application 106 may operably control one or more functions of the ego agent 102 based on the future predicted trajectories of the dynamic agents 202 located within the surrounding environment of the ego agent 102.

II. The Trajectory Prediction Application and Related Methods

Components of the trajectory prediction application 106 will now be described according to an exemplary embodiment and with reference to FIG. 1. In an exemplary embodiment, the trajectory prediction application 106 may be stored on the storage unit 120 and executed by the ECU 104 of the ego agent 102. In another embodiment, the trajectory prediction application 106 may be stored on an externally hosted computing infrastructure (not shown) and may be accessed by a telematics control unit (not shown) of the ego agent 102 to be executed by the ECU 104 of the ego agent 102.

The general functionality of trajectory prediction application 106 will now be discussed with continued reference to FIG. 1. In an exemplary embodiment, the trajectory prediction application 106 may include a plurality of modules 124-128 that may be configured to provide trajectory prediction by encoding multi-scale agent interactions from agent-augmented environments. The plurality of modules 124-128 may include a static representation module 124, a graph coarsening module 126, and an agent control module 128. However, it is appreciated that the trajectory prediction application 106 may include one or more additional modules and/or sub-modules that are included in lieu of the modules 124-128.

In an exemplary embodiment, the plurality of modules 124-128 may utilize the neural network 108 to generate the trajectories for each of the dynamic agents 202 that are located within the surrounding environment 200 of ego agent 102. The neural network 108 may analyze a sequence of each motion data for an arbitrary agent i that is split into the observation trajectory $X^i=\{(x,y)_t^i | t \in \{1, T_{in}\}\}$ and the future trajectory $Y^i=\{(x,y)_t^i | t \in \{T_{in}+1, T_{in}+T_{out}\}\}$, where $T_{in}$ is the observation horizon, $T_{out}$ is the prediction horizon, and $(x,y)_t^i$ denotes 2D coordinates of agent i at time t. The trajectory prediction application 106 may utilize a ground-truth segmentation map for the static structures 206 that is available from individual scenes which may be used to generate the agent-augmented surrounding environment 210 that pertain to respective time steps (e.g., t−n, t−3, t−2, t−1, t). Accordingly, as discussed in more detail below, the neural network 108 may predict a set of 2D locations Y" of original dynamic agents 202 and static agents 204 i∈{1, L}, given their past motion information $X^i \forall i \in MO$ together with those of J augmented static agents 212 i∈{L+1, L+J} and may output the prediction of the trajectories of each of the dynamic agents 202 to the trajectory prediction application 106.

Figure 3:
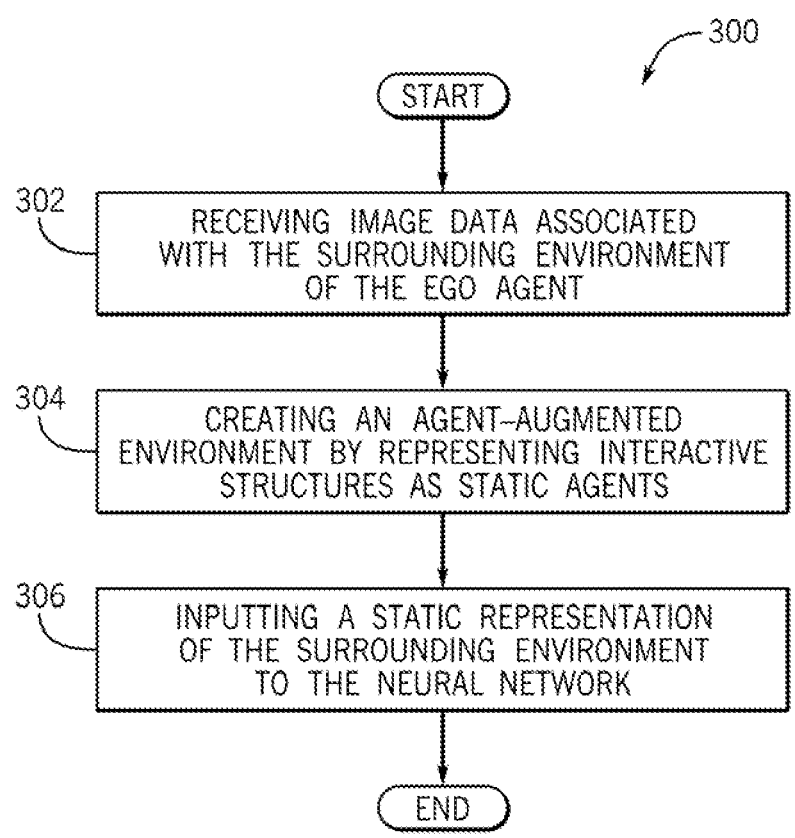
FIG. 3 is a process flow diagram of a method for creating an agent-augmented surrounding environment based on images of the surrounding environment of the ego agent according to an exemplary embodiment of the present disclosure.

FIG. 3 is a process flow diagram of a method 300 for creating an agent-augmented surrounding environment 210 based on images of the surrounding environment 200 of the ego agent 102 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving image data associated with the surrounding environment 200 of the ego agent 102.

In an exemplary embodiment, the static representation module 124 may be configured to receive environmental data that may be associated with the surrounding environment 200 of the ego agent 102 in the form of image data that may be provided by the camera system 122 of the ego agent 102 at a plurality of time steps. The camera system 122 may be configured to receive images captured at the plurality of time steps from the one or more cameras of the camera system 122. The camera system 122 may be configured to convert the plurality of images into image data and may communicate the image data associated with the plurality of images captured of the surrounding environment 200 at the plurality of time steps (e.g., t−n, t−3, t−2, t−1, t). Accordingly, past and present observations of the surrounding environment 200 that include the dynamic agents 202, the static agents 204, and the static structures 206 that may be located within the surrounding environment of the ego agent 102 may be included within the image data that is received by the static representation module 124. The motion based locations of the one or more static agents 204 from the perspective of the ego agent 102 as captured at each time step may be included within the image data.

The method 300 may proceed to block 304, wherein the method 300 may include creating an agent-augmented environment by representing interactive structures as static agents. In an exemplary embodiment, upon receiving the image data associated with the plurality of images captured of the surrounding environment 200 at the plurality of time steps, the static representation module 124 may be configured to execute the image logic to identify dynamic agents 202, static agents 204, and static structures 206 that may be located within the surrounding environment of the ego agent 102. In one embodiment, the static representation module 124 may be configured to generate segmentation maps using the image data associated with the plurality of images. The static representation module 124 may be configured to represent spatial boundaries of non-passable areas that may include locations of the surrounding environment 200 of the ego agent 102 that may include the static agents 204 and the static structures 206.

As discussed above with respect to FIG. 2B, the static representation module 124 may be configured to augment the respective boundaries of static structures 206 with augmented static agents 212 that may represent the occlusion caused by the existence of the respective static structures 206. Accordingly, the agent-augmented surrounding environment 210 may be processed that represent the static structures 206 as multiple augmented static agents 212 that enable the trajectory prediction application 106 and the neural network 108 to learn physical constraints of the surrounding environment 200 of the ego agent 102. Additionally, the static representation module 124 may be configured to augment static agents 204 as previously identified as being located within the surrounding environment 200 into augmented static agents 212 since they may also occlude the respective perspective paths of one or more dynamic agents 202. Accordingly, the static representation module 124 may be configured to leverage a similarity between static agents 204 and static structures 206 to represent environmental structures as multiple augmented static agents 212.

The method 300 may proceed to block 306, wherein the method 300 may include inputting a static representation of the surrounding environment 200 to the neural network 108. In an exemplary embodiment, upon processing the agent-augmented surrounding environment 210 as an augmented representation of the surrounding environment 200, the static representation module 124 may be configured to input the agent-augmented surrounding environment 210 as a static representation of the surrounding environment 200 to the neural network 108.

Figure 5:
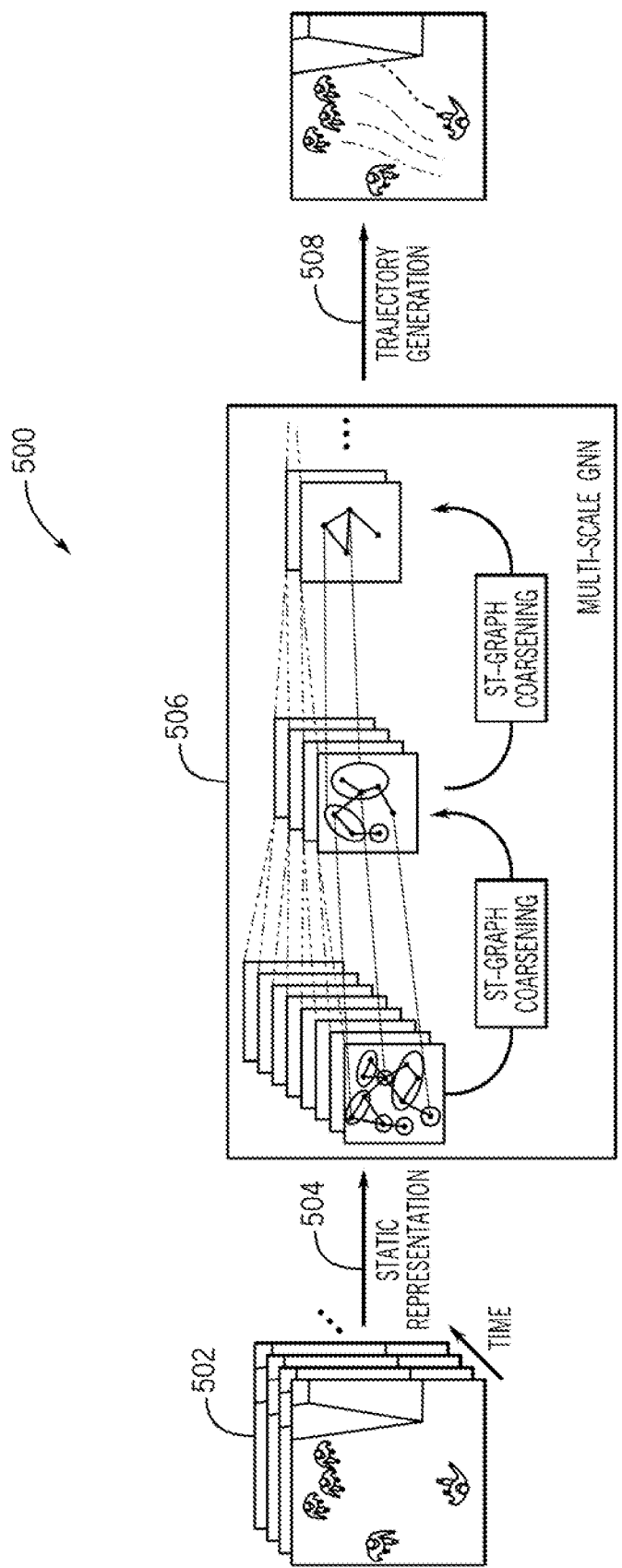
FIG. 5 is a schematic overview of a methodology executed by a trajectory prediction application according to an exemplary embodiment of the present disclosure.

With reference to FIG. 5, a schematic overview of a methodology executed by the trajectory prediction application 106 according to an exemplary embodiment of the present disclosure, as shown the static representation 504 may be included as an aggregated representation of the agent-augmented surrounding environment 210 that is processed based on the plurality of images 502 of the surrounding environment captured at the plurality of time steps that may be augmented with augmented static agents 212. The static representation 504 may accordingly be input as a spatial-temporal representation of the surrounding environment 200 as captured within the plurality of images 502 during the plurality of time steps.

In one embodiment, the static representation 504 may be provided with a representation of the surrounding environment 200 of the ego agent 102 as a scene with original L agents 202, 204 that is further augmented by additional J augmented static agents 212, resulting total N=L+J agents in the scene as captured at respective locations over the course of the plurality of time steps that have been captured within the plurality of images 502. From this static representation 504, joint modeling of agent-agent interactions (between dynamic agents 202 and static agents 204) and agent-space interactions (toward the augmented static agents 212) is processed by the neural network 108 by using a graph structure, where the graph edges accordingly find interactions between the nodes of spatial graphs.

Figure 4:
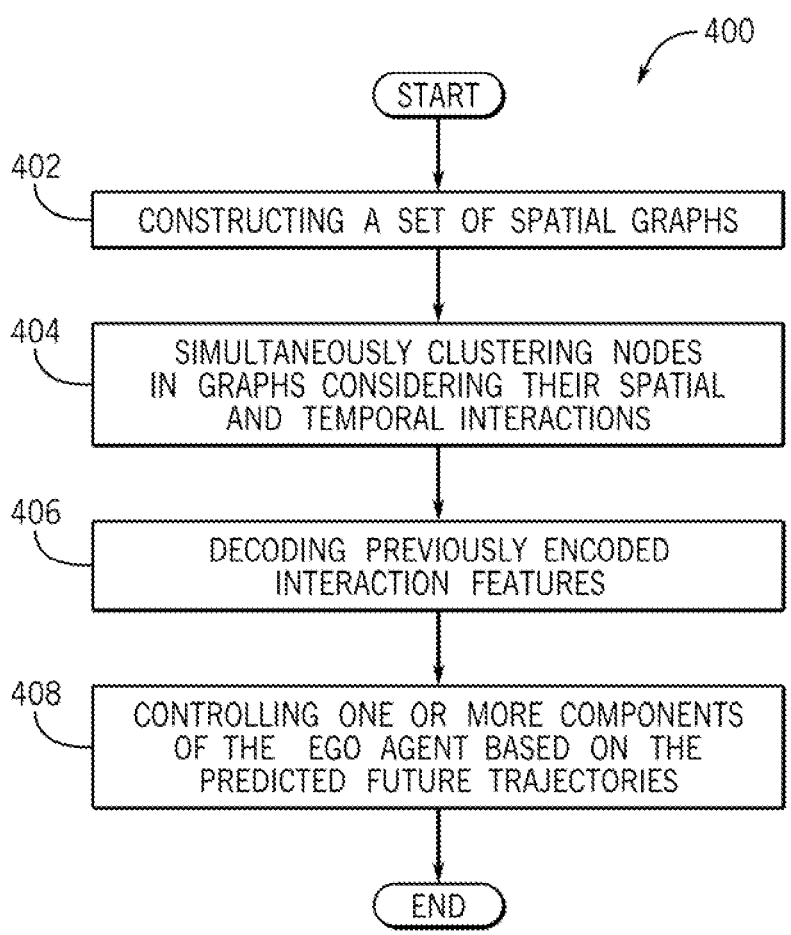
FIG. 4 is a process flow diagram of a method for predicting future trajectories associated with each of the dynamic agents located within the surrounding environment of the ego agent according to an exemplary embodiment of the present disclosure.

FIG. 4 is a process flow diagram of a method 400 for predicting future trajectories associated with each of the dynamic agents 202 located within the surrounding environment 200 of the ego agent 102 according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include constructing a set of spatial graphs.

In one embodiment, upon inputting the static representation 504 to the neural network 108, the static representation module 124 may communicate respective data to the graph coarsening module 126 of the trajectory prediction application 106. The graph coarsening module 126 may utilize the neural network 108 to execute machine learning/deep learning processes to model pair-wise interactions between the ego agent 102, the dynamic agents 202 located within the surrounding environment 200, and the static structures 206 that may be located within the surrounding environment of the ego agent 102. Accordingly, the neural network 108 may perform machine learning/deep learning processes to complete a graph coarsening process based on the static representation 504.

With reference again to FIG. 5, upon receiving the input of the static representation 504 of the surrounding environment 200 of the ego agent that includes the total N=L+J agents in the scene over a course of the plurality of time steps that have been captured within the plurality of images, the neural network 108 may be configured to utilize the encoder 112 to construct a number of spatial graphs 506 that correspond to the observation time horizon. The observation time horizon may be based on the number of time steps that have been captured within the plurality of images as included within the image data to the static representation module 124.

In one embodiment, the encoder 112 of the neural network 108 may be configured to process a set of spatial graphs 506 $G_t = (A_t, H_t)$ that are defined at individual observation time steps $t \in \{1, T_{in}\}$, where $A_t \in \mathbb{R}^{N \times N}$ is an adjacency matrix and $H_t \in \mathbb{R}^{N \times d}$ are the node embeddings of size d computed from the motion state of N agents at time step t. The message propagation of GNNs is given by:

$$H_t^{(k)} = M(A_t, H_t^{(k-1)}; W_t^{(k-1)}), \quad (1)$$

where M is a message propagation function that updates node features, k indicates an index of iterations, and $W_t$ are trainable parameters.

As a multi-scale GNN, the neural network 108 may model the interactions of each of the dynamic agents 202 to implement the message propagation function M as follows:

$$H_t^{(k)} = \Gamma(D_t^{-1/2} \hat{A}_t D_v^{-1/2} H_t^{(k-1)} W_t^{(k-1)}), \quad (2)$$

where σ is a non-linearity function, $\hat{A}_t = A_t + I$ adds self-connection to the graph, $D_t = \Sigma \hat{A}_{t,ij}$ is a sum of non-zero elements in the row of $\hat{A}_t$, and $W_t$ are trainable parameters. After K iterations, a set of adjacency matrices $\{A_t | t \in \{1, T_{in}\}\}$ and output node embeddings $\{Z_t | t \in \{1, T_{in}\}\}$ are generated, where $Z_t = H_t^{(K)} \in \mathbb{R}^{N \times d}$. For convenience of description, the subscript t is not used and a function Z=GNN(A,H) is used to represent the operation of the GNN layer, where A is an adjacency matrix, H is an input node matrix, and Z is an output node embeddings.

Figure 6:
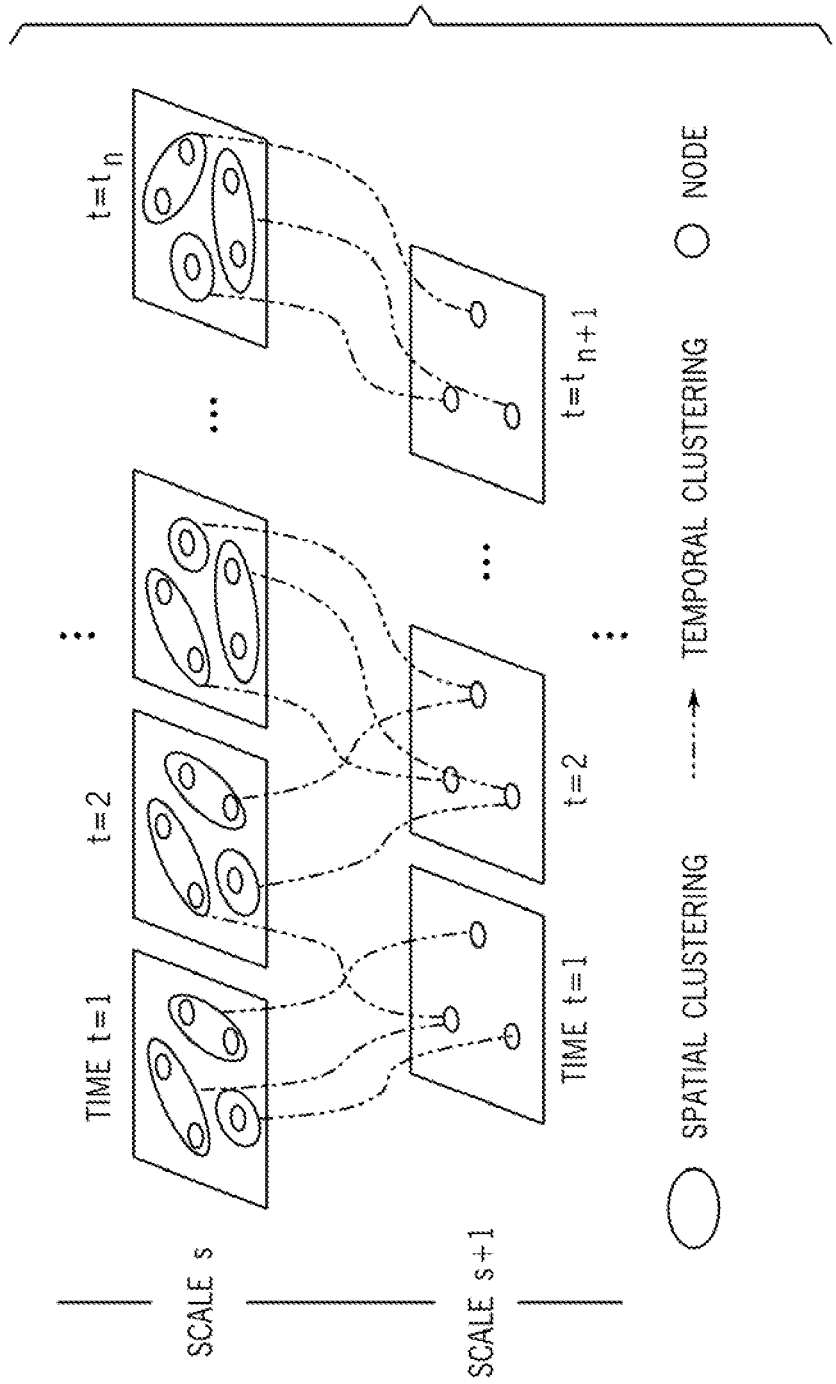
FIG. 6 is an illustrative clustering scheme executed by a neural network according to an exemplary embodiment of the present disclosure.

With continued reference to the method 400 of FIG. 4, upon construction of the set of spatial graphs 506, the method 400 may proceed to block 404, wherein the method 400 may include simultaneously clustering nodes in the spatial graphs 506 considering their spatial and temporal interactions. As represented by the illustrative clustering scheme of FIG. 6, the neural network 108 may be configured to complete spatio-temporal graph clustering to jointly coarsen input graphs in spatial and time dimension.

In one configuration, a learnable assignment matrix $U^{(s)} \in \mathbb{R}^{N_s \times N_{s+1}}$ may be defined at an arbitrary scale s, where a new coarsened graph at scale s+1 contains $N_{s+1} < N_s$ nodes. The assignment matrix $U^{(s)}$ is used to provide a soft assignment of individual $N_s$ nodes at scale s to one of $N_{s+1}$ clusters at the next scale s+1. Given the input node embedding matrix Z(s) and adjacency matrix A(s), the following equations may be computed using the assignment matrix U(s):

$$F^{(s+1)} = U^{(s)T} Z^{(s)}, \quad (3)$$

$$A^{(s+1)} = U^{(s)T} A^{(s)} U^{(s)}, \quad (4)$$

where $F^{(s+1)} \in \mathbb{R}^{N_{s+1} \times d}$ is a new node embedding matrix and $A^{(s+1)} \in \mathbb{R}^{N_{s+1} \times N_{s+1}}$ is a new coarsened adjacency matrix at scale s+1.

In an exemplary embodiment, upon the setting of spatial graphs 506 where the number of spatial graphs 506 correspond to the observation time horizon, the neural network 108 may apply graph clustering to spatial-temporal dimensions so that the nodes can be jointly assigned to the clusters under the consideration of spatial locality and temporal dependency. In one configuration, the encoder 112 may consider a stack of input matrices as a tensor, which may induce induces a third-order tensor $z \in \mathbb{R}^{N_s \times N_s \times T_s}$ and $\mathcal{A} \in \mathbb{R}^{N_s \times N_s \times T_s}$ where $T_s$ denotes the temporal dimension at scale s. The neural network 108 thereby uses the tensor n-mode product to conduct spatial and temporal graph coars,$e_N$g.

The n-mode product of a tensor $\mathcal{C} \in \mathbb{R}^{I_1 \times \cdots \times I_N}$ and a matrix $B \in \mathbb{R}^{J \times I_n}$ is denoted as $\mathcal{C} \times_n B$. Then, the output is computed as a tensor of size $\mathbb{R}^{I_1 \times I_2 \times \cdots \times I_{n-1} \times J \times I_{n+1} \times \cdots \times I_N}$ with entries $$(\mathcal{C} \times_n B)(i_1, \ldots, i_{n-1}, j, i_{n+1}, \ldots, i_N) = \Sigma_{i_n} \mathcal{C}(i_1, \ldots, i_N) B(j, i_n), \quad (5)$$

which results in a change of basis. In one configuration, a third-order tensor $\mathcal{C} \in \mathbb{R}^{I_1 \times I_2 \times I_3}$ with $C_{(i)}$ denotes i-th frontal slice of the tensor $\mathcal{C}$. Then, the transpose operation is defined by $$\mathcal{C}^{tr} \equiv [C_{(1)}^T, C_{(2)}^T, \ldots, C_{(I_3)}^T] \in \mathbb{R}^{I_2 \times I_1 \times I_3} \quad (6)$$

In another configuration, when $C \in \mathbb{R}^{I_1 \times I_2 \times I_3}$ $D \in \mathbb{R}^{I_1 \times I_4 \times I_3}$, the output of the product $C^{tr} * D$ is the tensor of size $I_2 \times I_4 \times I_3$, $$C^{tr} * D = [C_{(1)}^T \cdot D_{(1)}, C_{(2)}^T \cdot D_{(2)}, C_{(I_3)}^T \cdot D_{(I_3)}] \in \mathbb{R}^{I_2 \times I_4 \times I_3}, \quad (7)$$

where · denotes the usual matrix-matrix multiplication.

In an exemplary embodiment, the neural network 108 may create a spatial assignment tensor $\mathcal{U}^{(s)} \in \mathbb{R}^{N_s \times N_{s+1} \times T_s}$ for spatial graph clustering and an additional temporal assignment matrix $V^{(s)} \in \mathbb{R}^{T_s \times T_{s+1}}$ for temporal graph clustering, both at scale s. Employing the n-mode product, the new coarsened node embedding tensor $\mathcal{F}^{(s+1)}$ may be computed at scale s, similar to Eqn. (3) provided above:

$$\mathcal{F}^{(s)\dagger} = \mathcal{U}^{(s)^{tr}} * \mathcal{Z}^{(s)} \in \mathbb{R}^{N_{s+1} \times d \times T_s}, \quad (8)$$

$$\mathcal{F}^{(s+1)} = \mathcal{F}^{(s)\dagger} \times_3 V^{(s)T} \in \mathbb{R}^{N_{s+1} \times d \times T_{s+1}}. \quad (9)$$

The new adjacency tensor $\mathcal{A}^{(s+1)}$ at scale s may be computed similar to Eqn. (4) provided above:

$$\mathcal{A}^{(s)\dagger} = \mathcal{U}^{(s)^{tr}} * \mathcal{A}^{(s)} * \mathcal{U}^{(s)} \in \mathbb{R}^{N_{s+1} \times N_{s+1} \times T_s}, \quad (10)$$

$$\mathcal{A}^{(s+1)} = \mathcal{A}^{(s)\dagger} \times_3 V^{(s)T} \in \mathbb{R}^{N_{s+1} \times N_{s+1} \times T_{s+1}}, \quad (11)$$

where † in the superscript position indicates a temporary result of the spatial clustering.

Accordingly, given the motion states, the encoder 112 may provide the decoder 114 with social interactions between the dynamic agents 202 from the agent-augmented surrounding environment 210. The encoder 112 may initialize graphs $G_t = (A_t, F_t) \forall t \in \{1, T_{in}\}$ using the node embeddings of N agents (original L agents with augmented J agents) and the corresponding adjacency matrices. Accordingly, as a multi-scale GNN, the neural network 108 may generate output node embeddings using the input node features at scale s=1 such that $F_t^{(1)} = H_t$:

$$Z_t^{(1)} = GNN_{emb}(A_t^{(1)}, F_t^{(1)}), \forall t \in \{1, T_{in}\}. \quad (12)$$

$GNN_{emb}$ takes the t-th slice of the adjacency tensor and the corresponding node feature matrix. We denote the node embedding tensor $z^{(1)}$ as $\mathcal{C}$.

In one configuration, the proposed spatio-temporal graph clustering assigns each individual node in graphs to one of clusters under the consideration of spatial locality and temporal dependency. To make spatio-temporal graph clustering end-to-end differentiable, a stack of the spatial assignment matrices and temporal assignment matrix V are generated using same input $A_t^{(s)}$ and $F_t^{(s)}$ at scale s:

$$U_t^{(s)} = \Gamma(GNN_{spa}(A_t^{(s)}, F_t^{(s)})) \forall t \in \{1, \ldots, T_s\}, \quad (13)$$

where a denotes a softmax operation. The function $GNN_{spa}$ followed by the softmax enables the probabilistic assignment. To generate the temporal assignment matrix $V^{(s)}$, the neural network 108 uses the temporary result of spatial clustering in Eqn. (8) provided above by pooling the features along the first dimension pool $(\mathcal{F}^{(s)\dagger}) \in \mathbb{R}^{d \times T_s}$. The neural network 108 may create an additional adjacency matrix $B \in \mathbb{R}^{T_s \times T_s}$ and may compute:

$$V^{(s)} = \Gamma(GNN_{tmp}(B^{(s)}, pool(F^{(s)\dagger})^T)). \quad (14)$$

At the first scale s=1, each entity of $\mathcal{A}$ may be initialized using the inverse of Euclidean distance between two nodes and that of B with a vector of 1's to consider the entire graph.

After S times of S-T graph clustering, a single cluster may result that represents the encoding of spatio-temporal social interactions $z^{(s)} \in \mathbb{R}^{1 \times 1 \times d}$ abstracted from various scales of graphs. The model may be trained to use $z^{(s)}$ as an indicator of essential elements in the output node embeddings $\mathcal{C}$. An attention mechanism given by:

$$\mathcal{O}^\dagger = ATT_{spa}(\mathcal{C}, cat(\mathcal{C}, z^{(s)}); W_{spa}), \quad (15)$$

$$\mathcal{O} = ATT_{tmp}(\mathcal{O}^\dagger, cat(\mathcal{O}^\dagger, z^{(s)}); W_{tmp}), \quad (16)$$

may be used, where t indicates a temporary output and cat denotes the concatenation of features. By adopting two attention mechanisms ($ATT_{spa}$ and $ATT_{tmp}$), relevant dynamic agents 202 are highlighted (spatial dimension) and frames (temporal dimension) to decode future motion states of the dynamic agents 202 as discussed below.

Accordingly, using equations 8-11, as shown above, the neural network 108 may extract spatial-temporal interactions between the dynamic agents 202 and may thereby generate graph clustering toward a spatio-temporal domain. As discussed above and as represented in FIG. 5 and FIG. 6, multiple constructed graphs may be fine scaled to coarse-scale using spatio-temporal graph coarsening as described in detail above. The encoder 112 may encode individual nodes that are dynamically mapped to a set of clusters. Each cluster may correspond to a node in a new coarsened graph. Consequently, by using spatio-temporal graph clustering, behavioral representations are interactively encoded in a coarser level as a notion of both spatial locality and temporal dependency.

Referring again to the method 400 of FIG. 4, upon the clustering of nodes in the graphs based on spatio-temporal interactions and generating new coarsened graphs to encode behavioral representations in various scales, the method 400 may proceed to block 406, wherein the method 400 may include decoding previously encoded interaction features. In an exemplary embodiment, the neural network 108 may be configured to employ the decoder 114 of the neural network 108 to complete future trajectory decoding. In one configuration, the decoder 114 may be built using a set of convolutional layers and may be configured to predict future trajectories that are associated with each of the dynamic agents 202 located within the surrounding environment 200 of the ego agent 102 by decoding the interaction features previously encoded by the encoder 112 of the neural network 108.

In particular, the decoder 114 may be configured to decode the interaction encoded spatio-temporal features $\mathcal{Z}^{(s)}$, to predict future locations $Y_t$ of the dynamic agents 202 over the prediction time steps $t \in \{T_{in}+1, T_{in}+T_{out}\}$. In one configuration, the output of the decoder 114 is the mean $\overline{Reject}_t^i$, standard deviation $\Gamma_t^i$, and correlation coefficient $\mathrm{B}_t^i$, assuming a bivariate Gaussian distribution. Accordingly, each predicted future location of an arbitrary agent i is sampled by $(\hat{x}, \hat{y})_t^i \sim \mathcal{N}(\overline{Reject}_t^i, {}^{ti}\hat{\Gamma}_t, \mathrm{B}_t^i)$. In one embodiment, during training of the neural network 108, the negative log-likelihood given by $$\mathcal{L} = \frac{1}{L} \frac{1}{T_{out}} \sum_{i \in L} \sum_{t \in T_{out}} \log(P((x, y)_t^i \mid \overline{Reject}_i^{ti}\hat{\Gamma}_t, \mathrm{B}_t^i)), \quad (17)$$

is minimized, where L is the number of original dynamic agents 202/static agents 204.

As represented in FIG. 5, the trajectory prediction 508 associated with the dynamic agents 202 may be output by the neural network 108. The neural network 108 may be configured to communicate the predicted trajectories that are associated with each of the dynamic agents 202 at a plurality of future time steps $t \in \{T_{in}+1, T_{in}+T_{out}\}$ to the graph coarsening module 126 of the trajectory prediction application 106. The graph coarsening module 126 may thereby communicate the predicted trajectories associated with each of the dynamic agents 202 that are located within the surrounding environment 200 at each of the future time steps to the agent control module 130 of the trajectory prediction application 106.

With continued reference to FIG. 4, the method 400 may proceed to block 408, wherein the method 400 may include controlling one or more components of the ego agent 102 based on the predicted future trajectories. In one embodiment, upon receipt of the communication of the projected trajectories of each of the dynamic agents 202 that are located within the surrounding environment 200 of the ego agent 102, the agent control module 128 may be configured to output instructions to communicate the autonomous control parameters to the autonomous controller 116 of the ego agent 102 to autonomously control the ego agent 102 to avoid overlap with the respective predicted trajectories at one or more future time steps $t \in \{T_{in}+1, T_{in}+T_{out}\}$. In additional embodiments, the agent control module 130 may be configured to output instructions to agent systems/control units 118 to provide one or more alerts to the operator of the ego agent 102 to avoid overlap with the respective predicted trajectories of the dynamic agents 202 at one or more future time steps.

Figure 7:
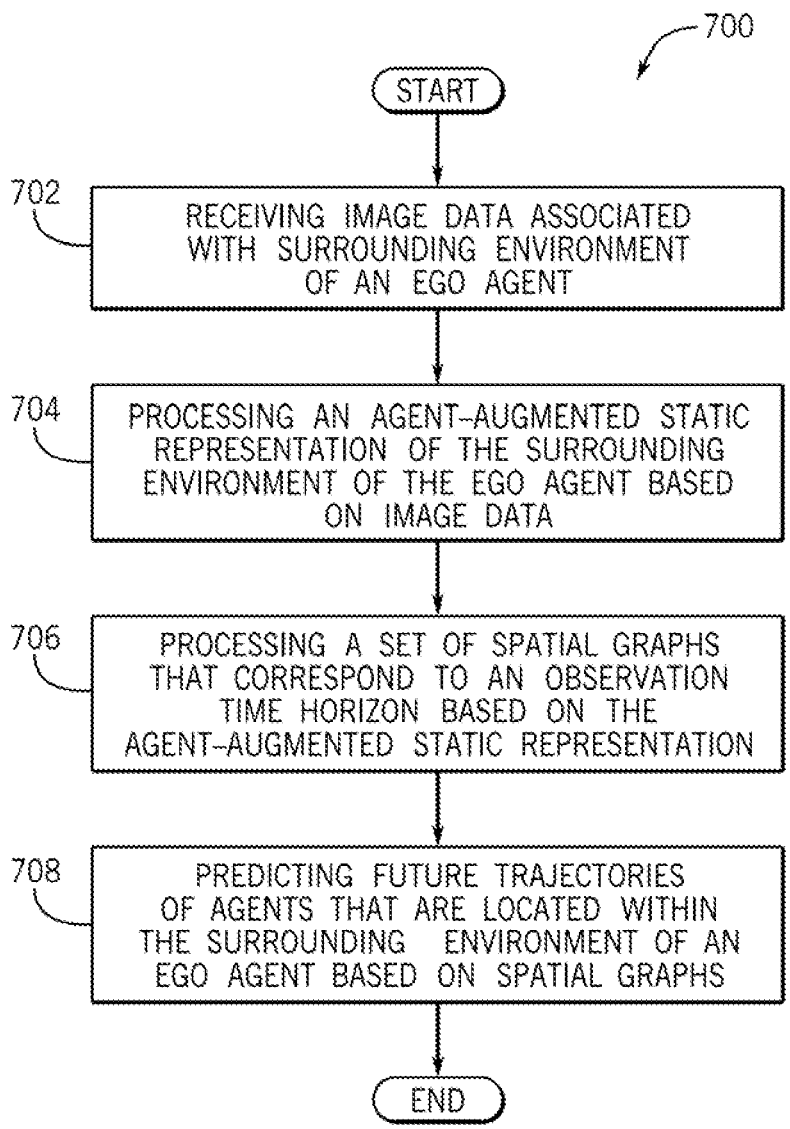
FIG. 7 is a process flow diagram of a method for completing trajectory prediction from agent-augmented environments according to an exemplary embodiment of the present disclosure.

FIG. 7 is a process flow diagram of a method 700 for completing trajectory prediction from agent-augmented environments according to an exemplary embodiment of the present disclosure. FIG. 7 will be described with reference to the components of FIG. 1 though it is to be appreciated that the method 700 of FIG. 7 may be used with other systems/components. The method 700 may begin at block 702, wherein the method 700 may include receiving image data associated with surrounding environment 200 of an ego agent 102.

The method 700 may proceed to block 704, wherein the method 700 may include processing an agent-augmented static representation of the surrounding environment 200 of the ego agent 102 based on the image data. The method 700 may proceed to block 706, wherein the method 700 may include processing a set of spatial graphs that correspond to an observation time horizon based on the agent-augmented static representation. In one embodiment, nodes in the spatial temporal graphs are simultaneously clustered considering their spatial and temporal interactions. The method 700 may proceed to block 708, wherein the method 700 may include predicting future trajectories of agents that are located within the surrounding environment of an ego agent 102 based on the spatial graphs.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for completing trajectory prediction from agent-augmented environments, comprising:

receiving image data associated with surrounding environment of an ego agent, wherein the image data includes dynamic agents and static structures located within the surrounding environment of the ego agent;

processing an agent-augmented static representation which is an augmented representation of the surrounding environment of the ego agent based on the image data, including augmenting boundaries of the static structures with respective augmented static agents that represent an obstruction to respective prospective paths of the dynamic agents that are caused by the existence of the respective static structures, further including representing at least one of the static structures as multiple augmented static agents enabling learning of physical constraints of the surrounding environment of the ego agent and predicting implausible respective future paths of the dynamic agents in view of the physical constraints of the surrounding environment;

processing the agent-augmented static representation of the surrounding environment of the ego agent includes augmenting boundaries of the static agents with augmented static agents that represent an occlusion to respective paths of the dynamic agents that are caused by the static structures, and leveraging a similarity between at least one static agent and at least one static structures to represent environmental structures as multiple augmented static agents to further enable learning of physical constraints of the surrounding environment of the ego agent;

processing a set of spatial graphs that correspond to an observation time horizon based on the agent-augmented static representation, wherein nodes in the spatial graphs are simultaneously clustered considering their spatial and temporal interactions;

predicting future trajectories of agents that are located within the surrounding environment of the ego agent based on the spatial graphs; and controlling at least one component of the ego agent based on the predicted future trajectories of agents within the surrounding environment of the ego agent to avoid overlap with the respective predicted future trajectories of the agents.

2. The computer-implemented method of claim 1, wherein the image data includes data associated with the surrounding environment of the ego agent based on a plurality of images that are captured at a plurality of time steps.

3. The computer-implemented method of claim 1, wherein the image data includes static agents that are located within the surrounding environment of the ego agent.

4. The computer-implemented method of claim 3, wherein processing the set of spatial graphs includes constructing the set of spatial graphs that pertain to a static representation of the surrounding environment that is based on the agent-augmented static representation.

5. The computer-implemented method of claim 4, wherein the set of spatial graphs model pair-wise interactions between the ego agent, the dynamic agents located within the surrounding environment, and the static structures that are located within the surrounding environment of the ego agent.

6. The computer-implemented method of claim 5, further including iteratively encoding interaction features in a coarser level as a notion of both spatial locality and temporal dependency, wherein new coarsened graphs include nodes that correspond to clusters that consider the spatial and temporal interactions.

7. The computer-implemented method of claim 6, wherein predicting future trajectories of the agents includes decoding previously encoded interaction features to predict future trajectories that are associated with each of the dynamic agents over a plurality of future time steps.

8. The method of claim 1, wherein processing the agent-augmented static representation includes graphically augmenting images of the surrounding environment of the ego agent with respect to at least one static structure that may occlude one or more perspective paths of the dynamic agents.

9. The method of claim 1, wherein the dynamic agents are dynamically located at different locations of the surrounding environment based on movement of the dynamic agents, and processing the spatial graphs includes dynamically mapping each individual node of the spatial graphs to a set of clusters.

10. A system for completing trajectory prediction from agent-augmented environments, comprising:
a memory storing instructions when executed by a processor cause the processor to:
receive image data associated with surrounding environment of an ego agent, wherein the image data includes dynamic agents and static structures located within the surrounding environment of the ego agent;
process an agent-augmented static representation which is an augmented representation of the surrounding environment of the ego agent based on the image data, including augmenting boundaries of the static structures with respective augmented static agents that represent an obstruction to respective prospective paths of the dynamic agents that are caused by the existence of the respective static structures, and represent at least one of the static structures as multiple augmented static agents to enable learning of physical constraints of the surrounding environment of the ego agent and predict implausible respective future paths of the dynamic agents in view of the physical constraints of the surrounding environment;
process the agent-augmented static representation of the surrounding environment of the ego agent includes augmenting boundaries of the static agents with augmented static agents that represent an occlusion to respective paths of the dynamic agents that are caused by the static structures, and leveraging a similarity between at least one static agent and at least one static structures to represent environmental structures as multiple augmented static agents to further enable learning of physical constraints of the surrounding environment of the ego agent;
process a set of spatial graphs that correspond to an observation time horizon based on the agent-augmented static representation, wherein nodes in the spatial graphs are simultaneously clustered considering their spatial and temporal interactions; predict future trajectories of agents that are located within the surrounding environment of the ego agent based on the spatial graphs; and
controlling at least one component of the ego agent based on the predicted future trajectories of agents within the surrounding environment of the ego agent to avoid overlap with the respective predicted future trajectories of the agents.

11. The system of claim 10, wherein the image data includes data associated with the surrounding environment of the ego agent based on a plurality of images that are captured at a plurality of time steps.

12. The system of claim 10, wherein the image data includes static agents that are located within the surrounding environment of the ego agent.

13. The system of claim 12, wherein processing the set of spatial graphs includes constructing the set of spatial graphs that pertain to a static representation of the surrounding environment that is based on the agent-augmented static representation.

14. The system of claim 13, wherein the set of spatial graphs model pair-wise interactions between the ego agent, the dynamic agents located within the surrounding environment, and the static structures that are located within the surrounding environment of the ego agent.

15. The system of claim 14, further including iteratively encoding interaction features in a coarser level as a notion of both spatial locality and temporal dependency, wherein new coarsened graphs include nodes that correspond to clusters that consider the spatial and temporal interactions.

16. The system of claim 15, wherein predicting future trajectories of the agents includes decoding previously encoded interaction features to predict future trajectories that are associated with each of the dynamic agents over a plurality of future time steps.

17. A non-transitory computer readable storage medium storing instructions that when executed by a computer, which includes a processor perform a method, the method comprising:
receiving image data associated with surrounding environment of an ego agent, wherein the image data includes dynamic agents and static structures located within the surrounding environment of the ego agent;
processing an agent-augmented static representation which is an augmented representation of the surrounding environment of the ego agent based on the image data, including augmenting boundaries of the static structures with respective augmented static agents that represent an obstruction to respective prospective paths of the dynamic agents that are caused by the existence of the static structures, further including representing at least one of the static structures as multiple augmented static agents enabling learning of physical constraints of the surrounding environment of the ego agent and predicting implausible respective future paths of the dynamic agents in view of the physical constraints of the surrounding environment;
processing the agent-augmented static representation of the surrounding environment of the ego agent includes augmenting boundaries of the static agents with augmented static agents that represent an occlusion to respective paths of the dynamic agents that are caused by the static structures, and leveraging a similarity between at least one static agent and at least one static structures to represent environmental structures as multiple augmented static agents to further enable learning of physical constraints of the surrounding environment of the ego agent;

processing a set of spatial graphs that correspond to an observation time horizon based on the agent-augmented static representation, wherein nodes in the spatial graphs are simultaneously clustered considering their spatial and temporal interactions;

predicting future trajectories of agents that are located within the surrounding environment of the ego agent based on the spatial graphs; and controlling at least one component of the ego agent based on the predicted future trajectories of agents within the surrounding environment of the ego agent to avoid overlap with the respective predicted future trajectories of the agents.

\* \* \* \* \*